United States Patent
Bertoldi et al.

(10) Patent No.: US 10,041,835 B2
(45) Date of Patent: Aug. 7, 2018

(54) COHERENT SPECTROSCOPIC METHODS WITH EXTENDED INTERROGATION TIMES AND SYSTEMS IMPLEMENTING SUCH METHODS

(71) Applicants: CENTRE NATIONAL DE LA RECHERCHE SCIENTIFIQUE—CNRS, Paris (FR); Institut d'Optique Graduate School, Palaiseau (FR); Observatoire de Paris, Paris (FR)

(72) Inventors: Andrea Bertoldi, Talence (FR); Ralf Kohlhaas, Gentilly (FR); Arnaud Landragin, Orsay (FR); Philippe Luc Bouyer, Talence (FR)

(73) Assignees: Centre National De La Recherche Scientifique—CNRS, Paris (FR); Institut D'Optique Graduate School, Palaiseau (FR); Observatoire De Paris, Paris (FR)

( * ) Notice: Subject to any disclaimer, the term of this patent is extended or adjusted under 35 U.S.C. 154(b) by 0 days.

(21) Appl. No.: 15/536,871

(22) PCT Filed: Dec. 18, 2015

(86) PCT No.: PCT/EP2015/080571
§ 371 (c)(1),
(2) Date: Jun. 16, 2017

(87) PCT Pub. No.: WO2016/097332
PCT Pub. Date: Jun. 23, 2016

(65) Prior Publication Data
US 2017/0356803 A1 Dec. 14, 2017

(30) Foreign Application Priority Data
Dec. 18, 2014 (EP) .................................. 14307085

(51) Int. Cl.
G01J 3/453 (2006.01)
G04F 5/14 (2006.01)
G01V 7/06 (2006.01)

(52) U.S. Cl.
CPC ............... *G01J 3/453* (2013.01); *G01V 7/06* (2013.01); *G04F 5/14* (2013.01); *G01B 2290/55* (2013.01)

(58) Field of Classification Search
CPC .. G01J 3/453; G04F 5/14; G01V 7/06; G01V 7/00; G01B 2290/55; B82Y 10/00; G06N 99/002
See application file for complete search history.

(56) References Cited

U.S. PATENT DOCUMENTS

| | | | | |
|---|---|---|---|---|
| 2004/0109217 A1* | 6/2004 | Maleki | ...................... | G04F 5/00 359/239 |
| 2013/0222801 A1* | 8/2013 | Harel | ........................ | G01J 3/10 356/328 |
| 2016/0378065 A1* | 12/2016 | Rochat | .................... | G04F 5/145 331/94.1 |

OTHER PUBLICATIONS

International Search Report issued in PCT/EP2015/080571 dated Mar. 22, 2016 (2 pages).

(Continued)

*Primary Examiner* — Michael P Lapage
(74) *Attorney, Agent, or Firm* — Osha Liang LLP

(57) ABSTRACT

Coherent spectroscopic methods are described, to measure the total phase difference during an extended interrogation interval between the signal delivered by a local oscillator (10) and that given by a quantum system (QS). According to one or more embodiments, the method may comprise reading out at the end of successive interrogation sub-intervals (Ti) intermediate error signals corresponding to the approximate phase difference (φ) between the phase of the LO signal and that of the quantum system, using coherence (Continued)

preserving measurements; shifting at the end of each interrogation sub-intervals (Ti) the phase of the local oscillator signal, by a known correction value ($_\varphi(i)_{FB}$) so as to avoid that the phase difference approaches the limit of the inversion region; reading out a final phase difference (φf) between the phase of the prestabilized oscillator signal and that of the quantum system using a precise measurement with no restriction on the destruction; reconstructing a total phase difference over the extended interrogation interval, as the sum of the final phase difference (φf) and the opposite of all the applied phase corrections figure (I).

15 Claims, 10 Drawing Sheets

(56) References Cited

OTHER PUBLICATIONS

Written Opinion of the International Searching Authority issued in PCT/EP2015/080571 dated Mar. 22, 2016 (7 pages).
Shiga, N. et al.; "Locking the local oscillator phase to the atomic phase via weak measurement"; New Journal of Physics, vol. 14, No. 2, Feb. 15, 2012 (19 pages).
Vanderbruggen, T. et al.; "Feedback Control of Trapped Coherent Atomic Ensembles"; Physical Review Letters, vol. 110, No. 21, May 20, 2013, (6 pages).
Haroche, S. et al.; "Atomic clocks for controlling light fields"; Physics Today 66(1) 27 (2013); Jan. 2013 (7 pages).
Gerginov, V. et al.; "Uncertainty evaluation of the caesium fountain clock PTB-CSF2"; Metrologia, 47, 65, 2010 (35 pages).
Rosenband, T. et al.; "Exponential scaling of clock stability with atom number"; arXiv:1303.6357v2 [quantum-ph], Mar. 28, 2013 (5 pages).
Merlet, S. et al.; "Operating an atom interferometer beyond its linear range"; Metrologia, 46, Jan. 6, 2009, pp. 87-94 (8 pages).
Sorrentino, F. et al.; "Simultaneous measurement of gravity acceleration and gravity gradient with an atom interferometer"; Applied Physics Letters, American Inst. of Physics, 101, pp. 114106 (2012) (6 pages).
Arecchi, F.T. et al.; "Atomic Coherent States in Quantum Optics"; Physical Review A, vol. 6, No. 6, Dec. 1972, pp. 2211-2237 (27 pages).
Hughes, K.J. et al.; "Suspension of Atoms Using Optical Pulses, and Application to Gravimetry"; Physical Review Letters, 102, 150403, pp. 1-4, Apr. 2009, (4 pages).

* cited by examiner

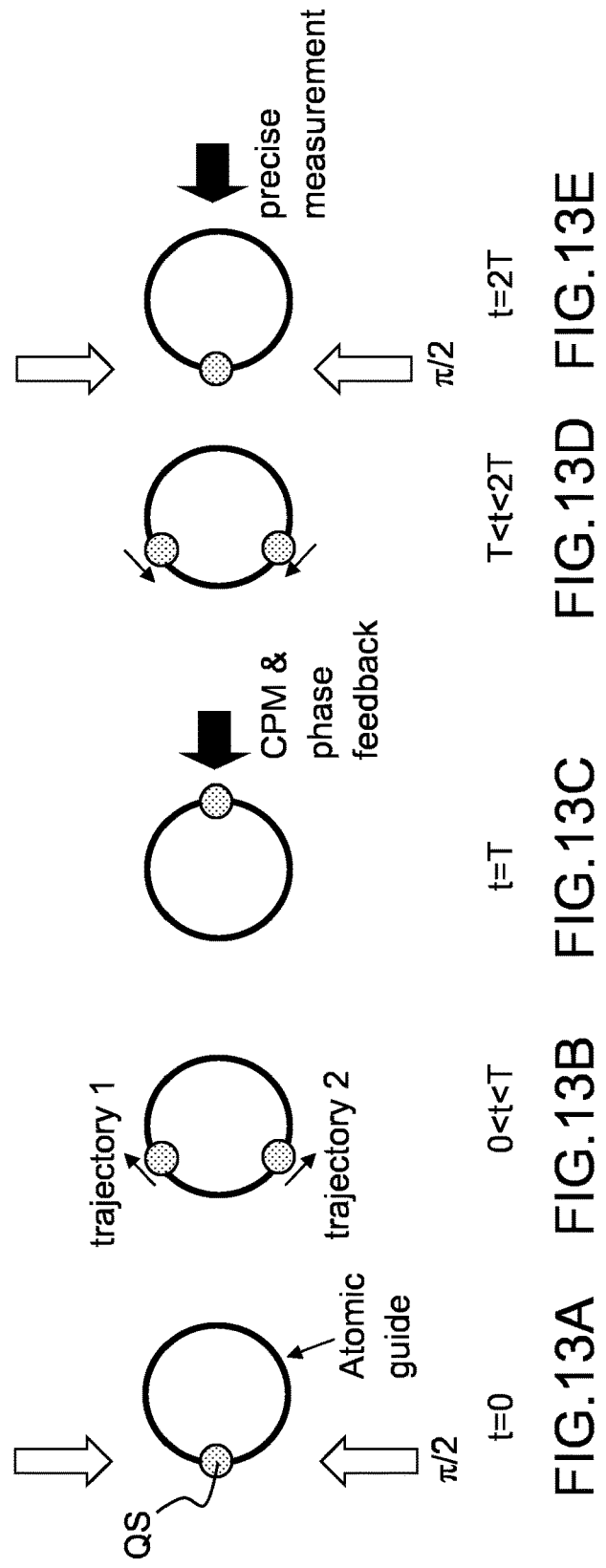

COHERENT SPECTROSCOPIC METHODS WITH EXTENDED INTERROGATION TIMES AND SYSTEMS IMPLEMENTING SUCH METHODS

PRIOR ART

Technical Field of the Disclosure

The present invention relates to coherent spectroscopic methods with extended interrogation times and systems implementing such methods. The invention applies more particularly to atomic interferometers such as atomic clocks or matter wave inertial sensors.

Prior Art

In coherent spectroscopic methods, also referred to as resonant spectroscopic methods, a coherent ensemble of two-level systems (TLSs) hereafter called a quantum system or QS, e.g. a coherent atomic or molecular ensemble, is coherently interrogated during a given interrogation time by an external electromagnetic field (the EM field), e.g. an optical field or a microwave field delivered by an external source also referred to as the local oscillator (LO). Interrogation is made by comparing the phase evolution of the EM field and the QS during the interrogation time; for example, the projection of the phase difference between the external EM field and the QS is measured as a population imbalance of the two levels.

In coherent spectroscopic methods, the two levels of the two-level system may refer to two internal states, e.g. the magnetically insensitive levels in a microwave hyperfine transition, or may refer to two motional external states, e.g. differing for the linear momentum. Rabi spectroscopy, Ramsey spectroscopy and in general nuclear magnetic resonance (NMR) spectroscopy are examples of coherent spectroscopic methods wherein interrogation is made on a superposition state of two internal levels of a quantum system, whereas Bragg and Raman atom interferometry are examples of coherent spectroscopic methods wherein interrogation is made on a superposition state of two external levels of a quantum system.

Many applications today as for example atomic clocks (both microwave and optical) and matter wave inertial sensors (e.g. gravimeters, gradiometers, gyroscopes), implement coherent spectroscopic methods. In these applications, a precise measurement and control of the relative phase between the quantum system and the EM field plays a crucial role.

In an atomic clock for example, a scheme of which is shown in FIG. 1, the frequency of a LO signal ("LO frequency"), a microwave or optical signal of frequency $\nu$, is repeatedly referenced to an atomic transition of frequency $\nu_{eg}$ of an atomic quantum system QS in a superposition state; the phase evolution of the LO signal is compared to that of the atomic quantum system QS during an interrogation time T, and a suitable feedback to the LO frequency is applied (see for example S. Haroche et al. "Atomic clocks for controlling light fields", Physics Today 66(1), 27 (2013)). The atomic quantum system QS is optically probed using a laser SRC and an optical detector DET to get information on the phase; the information is treated with a controller unit MCU that implements feedback to the LO frequency using a frequency actuator FQA.

During the interrogation, the atoms are in a superposition state, and the projection of the phase difference $\varphi$ between the LO signal and the atomic quantum system QS is measured by mapping it on a population imbalance of the two clock levels. The TLSs of the quantum system QS end up in their ground states or excited states with respective probabilities $p_g$ and $p_e$, which can be measured by accumulating statistics provided by a state-resolving detector, wherein $$p_g = 1 - p_e = (1 - \cos \varphi)/2$$

and $$\varphi = 2\pi(\upsilon_{eg} - \nu)T$$

FIG. 2 (from V. Gerginov et al. "Uncertainty evaluation of the caesium fountain clock PTB-CSF2", Metrologia 47, 65 (2010)) shows in an example of a Cesium fountain clock, the transition probability $p_e$ as a function of the frequency detuning $\upsilon_{eg} - \nu$. As $\nu$ is swept through $\nu_{eg}$, the probabilities $p_g$ and $p_e$ exhibit interference fringes whose spacing scales as 1/T, as shown in FIG. 2. Locking the LO frequency on the central fringe at $\nu = \nu_{eg}$ thus produces a time standard locked to the regular ticking of the atomic electrons. To obtain narrower fringes, hence better frequency resolution, T should be longer. Atomic fountain clocks therefore interrogate slow atoms, whose velocity distribution in the reference of the center of mass of the atomic ensemble has been reduced by laser cooling to a spread of around 1 cm/s; as a consequence the atomic ensemble launched vertically can be interrogated in the time interval of a few hundreds ms between the two passages in a region along the vertical direction where the coherent manipulation is applied, typically using a microwave cavity. As shown in FIG. 2, an interrogation time T of 0.5 s results in fringe spacing of 2 Hz. Averaging signals over a day achieves frequency stabilization better than $10^{-5}$ of that spacing. The resulting clock uncertainty considering the microwave transition frequency is $10^{-15}$, roughly 1 second in 30 million years. A 100-fold smaller uncertainty, on the scale of a few seconds over the age of the universe, has recently been achieved using optical clocks.

However, the phase difference $\varphi$ must stay within a given interval, hereafter called "inversion region", in order to be unambiguously determined from its projection measured as a population imbalance. Such inversion interval is $[-\pi/2:+\pi/2]$ if it is possible to measure only one projection of $\varphi$ or $[-\pi:+\pi]$ if two orthogonal projections of $\varphi$ can be determined. Hence, for a given LO noise, the interrogation time T of a TLS transition must be kept short enough such that phase differences beyond the inversion region are avoided. Currently, LO noise limits the interrogation time in ion (see for example C. W. Chou et al., "Frequency comparison of two high-accuracy Al+ optical clocks," Phys. Rev. Lett. 104, 070802 (2010) and optical lattice clocks (see N. Hinkley et al., "An atomic clock with $10^{-18}$ instability", Science 341, 1215 (2013)).

The standard approach to tackle this issue consists in improving the quality of local oscillators (see Y. Y. Jiang et al., "Making optical atomic clocks more stable with $10^{-16}$-level laser stabilization", Nature Photon. 5, 158 (2011)).

As an alternative, it has been recently proposed to reconstruct the LO phase evolution using several atomic ensembles (see for example T. Rosenband et al., "Exponential scaling of clock stability with atom number", arXiv: 1303.6357 [quantum-ph] (2013)). In this article, it is shown how combining M ensembles of N atoms with a variety of interrogation times enables to reduce the frequency variance of a standard Ramsey clock. However, it requires using separate atomic ensembles, each atomic ensemble using a separate chamber to avoid crosstalk, or a technique to separate a large collection of atoms into separated ensembles, which in both cases determines severe technological issues and increases the experimental complexity.

A method of reducing the phase difference of a local oscillator signal with respect to the phase of an atomic quantum system has also been proposed in Shiga et al., "Locking the local oscillator phase to the atomic phase via weak measurements", New J. Phys. 14, 023034 (2012). The method disclosed in the article increases the interrogation time using successive weak measurements on the same atomic QS, each one followed by feedback on the frequency of the local oscillator. In this way, the phase difference between the LO signal and the atomic QS is controlled by acting on the LO frequency, only minimally destroying the coherence of the spin. However in this method, the signal-to-noise ratio (SNR) of the phase measurement over the extended interrogation interval is limited by the intrinsically low SNR of the weak measurement adopted in the intermediate interrogations and in the final interrogation.

As for atomic clocks, in matter wave inertial sensors a phase is read out at the end of an interrogation sequence. This phase is the result of a differential evolution over separated trajectories followed by external wave function of the atomic QS, in combination with an inertial effect like the gravitational acceleration or a rotation (see for example J. M. Hogan et al., "Light-pulse atom interferometry" in "Atom Optics and Space Physics", editor E. Arimondo et al, (Amsterdam: IOS) p. 411 (2009)).

As shown in FIG. 3 for a vertical gravimeter in a Mach-Zehnder configuration, each atom is split at time t=0 in two wave packets with different trajectories, which are deflected at t=T and recombined at t=2T. These manipulations use two photon transitions, operated with two counter propagating laser beams represented in the space-time diagram by couples of vertical arrows at the positions where the interactions between the radiation and the matter wave take place. The separation of the trajectories represented in FIG. 3 by the lines 31, 32 is due to the momentum transfer associated to these transitions. The recombination of the two paths at time 2T projects each atom on one of the two diverging paths, called the output ports of the interferometer. The atomic population ratio on the two output ports is then measured by a detection system, and results as the projection of the difference between two phases: the first phase $\varphi_{at}$ is generated by the vertical acceleration of the atoms and is equal to $kgT^2$, where k is the effective two photon wave vector, g the gravity acceleration, and T the length of the interrogation interval. For example, this phase is equal to $1.5778 \times 10^6$ rad in the case of a two photon Raman transition on the D2 line of $^{87}$Rb adopted for the splitting (i.e. $k=1.61 \times 10^7$ m$^{-1}$), T=100 ms, and g=9.8 m s$^{-2}$. This phase contribution is equivalent, in the atomic clock case, to the phase acquired by the quantum system in the superposition state because of the energy separation of the two internal states. The second phase $\varphi_{LO}$ is given by the vertical acceleration of the optical grating formed by the two counter propagating beams (represented in FIG. 3 with the horizontal, equally spaced lines $G_0$, $G_1$, and G2 at the time of the interrogation pulses). This phase is controlled by acting on the relative phase of the two counter propagating beams; for example, to produce a constant acceleration a frequency chirp is applied to one of the two beams. The evolution of the vertical grating phase is calibrated to compensate the phase determined by the atomic evolution in the gravitational field, so as to obtain a total interferometric phase close to zero. The vertical optical grating has then the same role assumed in an atomic clock by the local oscillator. In the same way of what happens for the LO in an atomic clock, the stability of the vertical optical grating determines the sensitivity of the measurement: the noise of the grating phase, due for example to the relative mechanical acceleration of the two collimators delivering the two laser components, determines a signal that is interpreted as a real acceleration. Removal procedures exist for these phase contributions, based on the reconstruction of the fringe signal determined by a systematic shift of the LO phase in successive measurement cycles. Nevertheless, the noise induced phase must be small compared to the $[-\pi/2; \pi/2]$ inversion region, to avoid ambiguity in the readout. The common approach to maintain the phase noise below the allowed threshold consists in limiting the interrogation time T so as to have a high fringe visibility. Recently the interval over which the phase can be inverted has been extended by using an external classical accelerometer [S. Merlet, et al., "Operating an atom interferometer beyond its linear range", Metrologia 46, 87 (2009)] or a second correlated atomic interferometer [F. Sorrentino, et al., "Simultaneous measurement of gravity acceleration and gravity gradient with an atom interferometer", Appl. Phys. Lett. 101, 114106 (2012)]. These solutions bring only a modest increase of the region over which the interferometric phase can be univocally determined, at the expense of a higher complexity of the experimental setup and of the data analysis algorithms.

An object of the invention is to propose coherent spectroscopic methods and systems implementing such coherent spectroscopic methods without the limitations of the prior art. More precisely, the invention proposes coherent spectroscopic methods, where the LO is phase-locked to the quantum system so as to extend the unambiguous measurement interval, which in turn increases the sensitivity.

In an atomic clock, for example, such method enables to overcome the limitation set by the noise of the local oscillator, which is nowadays the limiting factor for the best performing clocks. The present invention improves the schemes proposed previously; compared to the scheme described in Shiga et al., it achieves a better phase measurement at each interrogation cycle and thus a better sensitivity when implemented in a clock; compared to Rosenband et al., it brings to comparable performances with a single atomic ensemble instead of requiring a new ensemble each time the effective interrogation time doubles.

In other atomic interferometers, such as atomic inertial sensors, it enables longer interrogation intervals and higher sensitivity by locking the phase of the optical grating used to measure the atomic evolution to the atomic phase which evolves because of the inertial force.

SUMMARY OF THE DISCLOSURE

According to a first aspect, one or more embodiments relate to a coherent spectroscopic method to measure the total phase difference during an extended interrogation interval between the signal delivered by a local oscillator (LO) and that given by a first coherent ensemble of two-level systems (TLSs), said the master quantum system (master QS), wherein each TLS is in a superposition state of two quantum states, the method comprising:
  reading out at the end of successive interrogation sub-intervals intermediate error signals corresponding to the approximate phase difference between the phase of the LO signal and that of a second coherent ensemble of two-level systems, said the secondary quantum system (secondary QS), using coherence preserving measurements;

shifting, at the end of each interrogation sub-interval, the phase of LO signal by a known correction value so as to avoid that the phase difference between the LO signal and the superposition state of the secondary QS approaches the limit of the inversion region; this generates a prestabilized LO;

reading out a final phase difference between the phase of the prestabilized LO signal and that of the superposition state of the master QS using a precise measurement with no restriction on the destruction of the coherence of the master quantum system;

reconstructing a total phase difference over the extended interrogation interval defined as the sum of all successive interrogation sub-intervals, the total phase difference being reconstructed as the sum of the final phase difference and the opposite of all the applied phase corrections.

The applicants have shown that the above described method enables the phase locking of a classical system (the LO signal) to a quantum system, thus giving a direct link in metrology to the fundamental oscillations of quantum particles and enhancing sensitivities.

According to one or more embodiments, the secondary QS is the master QS itself and the intermediate error signals correspond to the approximate phase difference between the phase of the LO signal and that of the superposition state of the master QS. This enables to achieve good performances with a single atomic ensemble.

According to one or more embodiments, the master QS and the secondary QS are two separated quantum systems having the same transition frequency, and the intermediate error signals correspond to the approximate phase difference between the phase of the LO signal and that of the superposition state of the secondary QS.

According to one or more embodiments, the master QS and the secondary QS have different transition frequencies.

In the latter embodiments, when the master QS and the secondary QS are two separated quantum systems, the intermediate measurements made on the secondary QS do not perturb the master QS, which maintains its full initial coherence for the final measurement. The two ensembles scheme may remove the requirement of finding a good trade-off between the amount of coherence used for the intermediate measurements and that reserved for the final precise measurement, which is instead the case of the single ensemble scheme.

According to one or more embodiments, shifting the phase of the LO signal may be made only when the measured error signal exceeds a given value. This determines an easier practical implementation, with a simple correction procedure.

According to one or more embodiments, the phase correction value may be a predetermined absolute value and the sign opposite to the measured phase drift. This variant has the advantage of removing a long term phase drift with a simple phase actuator.

According to one or more embodiments, the correction value may be negatively proportional to the measured error signal so as to bring the phase difference close to zero. This variant applies the best phase correction after each measurement, and then minimizes the possibility of having a phase excursion beyond the inversion region during the extended interrogation interval.

According to a second aspect, one or more embodiments relate to a coherent spectroscopic method to measure the total phase difference during an extended interrogation interval between the signal delivered by a local oscillator (LO) and that given by a first coherent ensemble of two-level systems (TLSs), said the master quantum system (master QS), wherein each TLS is in a superposition state of two quantum states, the method comprising:

reading out at the end of successive interrogation sub-intervals intermediate error signals corresponding to the approximate phase difference between the phase of the LO signal and that of a second coherent ensemble of two-level systems, said the secondary quantum system (secondary QS), using preserving coherence measurements;

shifting at the end of each interrogation sub-intervals the phase of the secondary QS by a known correction value so as to avoid that the phase difference between the LO signal and the superposition state of the secondary QS approaches the limit of the inversion region;

reading out a final phase difference between the phase of the LO and that of the superposition state of the master QS using a precise measurement with no restriction on the destruction of the coherence of the master quantum system;

reconstructing a total phase difference over the extended interrogation interval defined as the sum of all successive interrogation sub-intervals, the total phase difference being reconstructed as the sum of the final phase difference and the opposite of all the applied phase corrections.

According to one or more embodiments of the second aspect, the secondary QS is the master QS itself and the intermediate error signals correspond to the approximate phase difference between the phase of the LO signal and that of the superposition state of the master QS.

According to one or more embodiments of the second aspect, the master QS and the secondary QS are two separated quantum systems having the same transition frequency, and the intermediate error signals correspond to the approximate phase difference between the phase of the LO signal and that of the superposition state of the secondary QS.

According to one or more embodiments of the second aspect, the master QS and the secondary QS have different transition frequencies.

According to one or more embodiments, the steps of the methods according to one of the first or second aspects are repeated for a given number of subsequent interrogation cycles $N_c$ and an averaged total phase difference is determined, which determines a $N_c^{1/2}$ improvement of the measurement sensitivity.

According to one or more embodiments, the methods according to the present description may be implemented in spectroscopic measurements, in which case, the value of the total phase difference is directly used to determine a frequency transition.

According to one or more embodiments, the methods according to the present description may be implemented in an atomic clock. The methods then further comprise changing the frequency of the LO signal at the end of an extended interrogation interval by the total phase difference divided by the extended interrogation interval.

According to one or more embodiments, the methods according to the present description may be implemented in a matter wave inertial sensor. The methods then further comprise determining a physical parameter (e.g. gravity acceleration and its gradient, rotation) from the total phase difference.

According to one or more embodiments, the methods according to the present description may be implemented in hybrid inertial navigation systems, which combines an atom interferometry based sensor and a second sensor with a continuous readout (e.g. a laser gyroscope in the case of a rotation measurement). The method then further comprises calibrating the output of the sensor with continuous readout at the end of each extended interrogation interval, using the absolute readout of the matter wave sensor represented by the total phase difference measured over the extended interrogation interval.

According to further aspects, one or more embodiments relate to systems for implementing coherent spectroscopic methods as described above.

According to one or more embodiments, the system comprises a first coherent ensemble of two-level systems (TLSs), said the master quantum system (master QS), wherein each TLS is in a superposition state of two quantum states, a local oscillator (LO) delivering an oscillator signal (LO signal), and further comprises:
  a preserving coherence measurement probe, to read out after interrogation sub-intervals intermediate error signals corresponding to the approximate phase difference between the phase of the LO signal and that of a second ensemble of two-level systems, said the secondary quantum system (secondary QS);
  a phase actuator for shifting at the end of each interrogation sub-interval the phase of the LO signal, by a known correction value, so as to avoid that the phase difference between the LO signal and that of the superposition state of the secondary QS approaches the limit of the inversion region; this generates a prestabilized local oscillator;
  a precise measurement probe to read out with no restriction on the destruction of the coherence of the master quantum system a final phase difference between the phase of the prestabilized LO signal and that of the superposition state of the master QS;
  a control unit for reconstructing the total phase difference over an extended interrogation interval defined as the sum of all successive interrogation sub-intervals, as the sum of the final phase difference and the opposite of all the applied phase corrections.

According to one or more embodiments, the secondary QS is the master QS itself.

According to one or more embodiments, the secondary QS and the master QS are separated ensembles, having the same transition frequency, and the preserving coherence measurement probe enables to read out intermediate error signals corresponding to the approximate phase difference between the phase of the LO signal and that of the superposition state of said secondary QS.

According to one or more embodiments, the secondary QS and the master QS are separated ensembles, having different transition frequencies.

According to one or more embodiments, systems as described in the present disclosure may be used as atomic clocks, in which case the signal delivered by the LO is the clock signal, and the system further comprises a frequency actuator to change the frequency of the clock signal as function of the total phase difference.

According to one or more embodiments, systems as described in the present disclosure may be used as matter wave inertial sensors, such as gravimeters, gradiometers, and gyroscopes, in which case a physical parameter (respectively gravity acceleration, acceleration gradient, and rotation rate) is derived from the total phase difference.

BRIEF DESCRIPTION OF THE DRAWINGS

Other advantages and characteristics of the invention will become apparent on reading the description, illustrated by the following figures. In the figures, identical elements are tagged by the same references.

FIG. 13A to 13E show the sequence of operations in an atomic gyroscope that implements a coherent spectroscopic method according to the present description.

DETAILED DESCRIPTION

Figure 4:
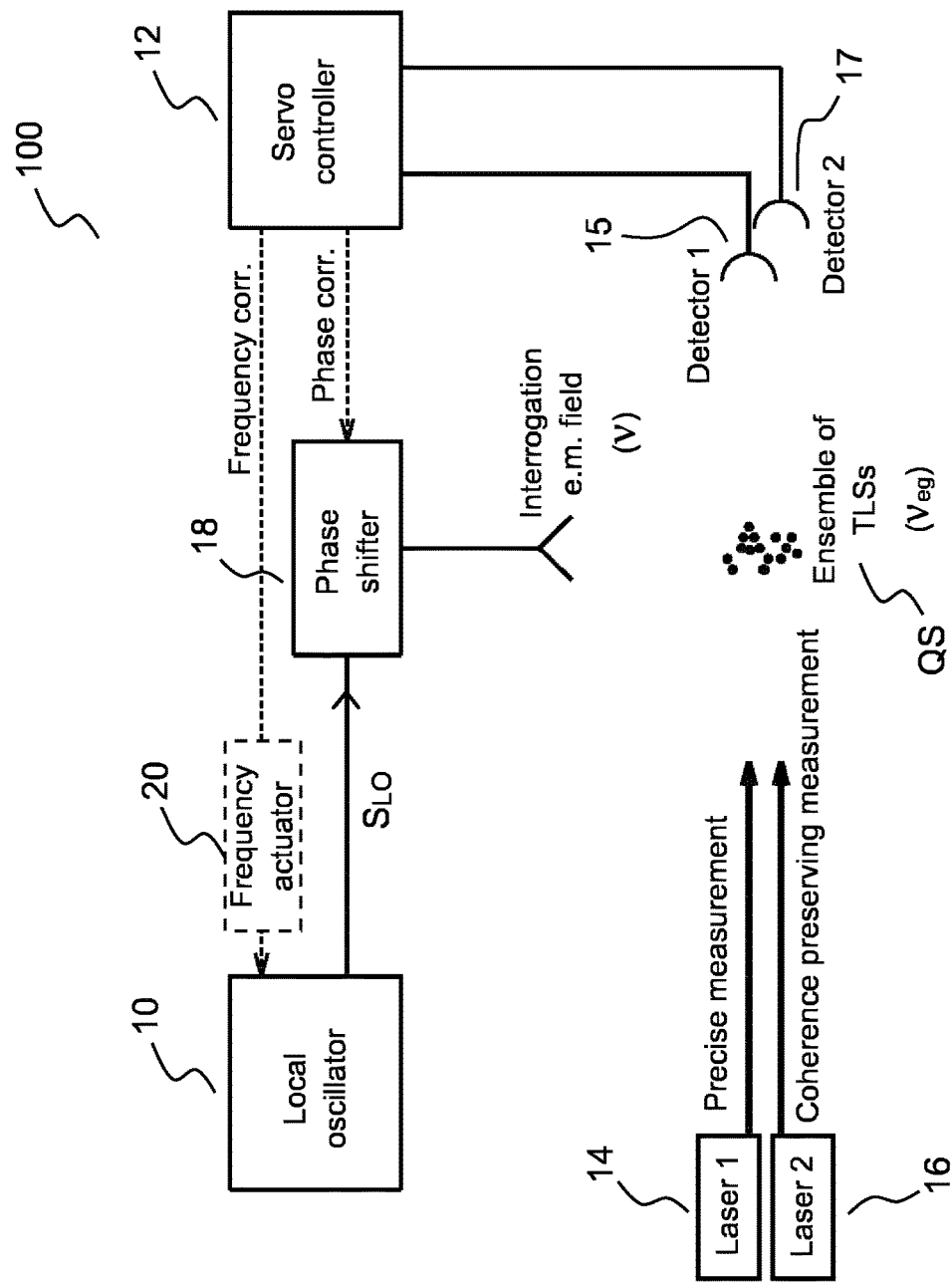
FIG. 4 shows a general scheme of a first embodiment of a system adapted to implement coherent spectroscopic methods according to the present description.

FIG. 4 shows a general scheme of a system adapted to implement coherent spectroscopic methods according to the present description according to an embodiment.

The system 100 as shown in FIG. 4 comprises a coherent ensemble QS of two-level systems (TLSs), referred to in the present description as a quantum system (QS).

The most prominent examples of coherent spectroscopic methods described hereafter use atomic TLSs, but they may also use other systems, like molecular TLSs, quantum dots and ions to mention a few.

For example, the system shown in FIG. 4 may be adapted to achieve spectroscopic measurements, i.e. measurement of an atomic transition frequency, or to be used as an atomic clock. In the latter case, the quantum system is for example an atomic ensemble with each atom manipulated on two energy eigenstates defining an atomic transition of frequency $v_{eg}$, said the clock transition.

The system 100 further comprises a local oscillator 10 ("LO"), delivering an oscillator signal $S_{LO}$ of frequency $v$, said the clock signal in the case of an atomic clock. The oscillator signal is an electromagnetic field; it may be for example an optical field or a microwave field. The frequency $\nu$ of the oscillator signal $S_{LO}$ is close to the frequency $\nu_{eg}$ of the atomic transition so that the phase difference $\varphi$ between the two oscillators drifts slowly because of the LO noise.

The oscillator signal $S_{LO}$ may be used to generate a control pulse ("interrogation e.m. field"), said control pulse being an amplified or non-amplified version of the oscillator signal, for coherent manipulations of the QS as it will be further described.

The system 100 further comprises a phase actuator 18, or phase shifter, to shift the phase of the oscillator signal $S_{LO}$. In the microwave domain, such phase actuator may be a microwave transmission line whose length can be controlled analogically or digitally, and in the optical domain, such phase actuator may be an electro-optic phase modulator.

The system 100 further comprises a coherence preserving measurement ("CPM") probe (16, 17), which aims at reading out error signals corresponding to the approximate phase difference ($\varphi$) between the phase of the oscillator signal $S_{LO}$ and that of the superposition state of the coherent ensemble QS, mapped to a population imbalance for the atomic ensemble, with low or no change of the coherence of the quantum system QS. Several methods exist to perform a CPM; when a free space radiation probe is used to measure the ensemble population imbalance, a large detuning from the atomic resonances may be adopted to limit decoherence induced by spontaneous emission. In the case of cavity aided detection, the quality of the measurement is set by the magnitude of the collective cooperativity, and even the on-resonance interaction regime between the probe and the ensemble can provide a population imbalance readout with a limited decoherence of the ensemble. Several methods can be adopted experimentally to implement a CPM of the ensemble population imbalance, like measuring the phase shift or the polarization rotation caused on a laser, or measuring the frequency shift of the modes in a high-finesse cavity. For example in T. Vanderbruggent et al., "Feedback control of trapped coherent atomic ensembles", Phys. Rev. Lett. 110, 210503 (2013), a heterodyne probe is adopted to dispersively measure the two level populations with different frequency components, and generating the population difference signal with an optical beating on a photodiode. A balanced population on the two hyperfine levels used for the clock transition (i.e. IF=1, $m_F$=0>→|F=2, mF=0> on the $5^2S_{1/2}$ electronic state) determine a zero readout signal, and a linear dependence from the population imbalance. The coherence preserving probe measures the relative phase with a minimal impact on the QS; this means a low measurement induced destructivity, given for example by spontaneous emission, and then only a small reduction of the QS coherence. The consequence is that after the probe the phase of the QS is still defined, and the phase measurement can continue with time correlation between successive measurements.

The system 100 also comprises a precise measurement ("PM") probe (14, 15) to read out the error signal with no restriction on the destruction of the atomic state.

The system 100 further comprises a control unit 12 for treating the averaged error signal and sending a signal to the phase actuator and eventually, to the frequency actuator.

According to the present description, the preserving coherence measurement probe enables to read out after interrogation sub-intervals $T_i$ intermediate error signals corresponding to the approximate phase difference $\varphi$ between the phase of the oscillator signal and that of the superposition state of the quantum system QS; the phase actuator 18 may shift, at the end of each interrogation sub-intervals $T_i$, the phase of the local oscillator signal by a known correction value $\varphi^{(i)}_{FB}$, said correction value being a function of the intermediate error signal, so as to avoid that the phase difference between the local oscillator and the atomic ensemble approaches the limit of the inversion region. The local oscillator signal obtained at the output of the phase actuator is said to be "prestabilized". The precise measurement probe (14, 15) reads out with no restriction on the destruction a final phase difference $\varphi_f$ between the phase of the prestabilized oscillator signal and that of the superposition state of the master ensemble. The control unit 12 is used for reconstructing the total phase difference over an extended interrogation interval defined as the sum of all successive interrogation sub-intervals $T_i$, wherein the total phase difference is the sum of the final phase difference ($\varphi_f$) and the opposite of all the applied phase corrections $$\left(-\sum_i \varphi^{(i)}_{FB}\right).$$

In the case of an atomic clock, the system 100 may further comprise a frequency actuator 20, to change the frequency of the clock signal as a function of the total phase difference measured over the extended interrogation interval.

Figure 5:
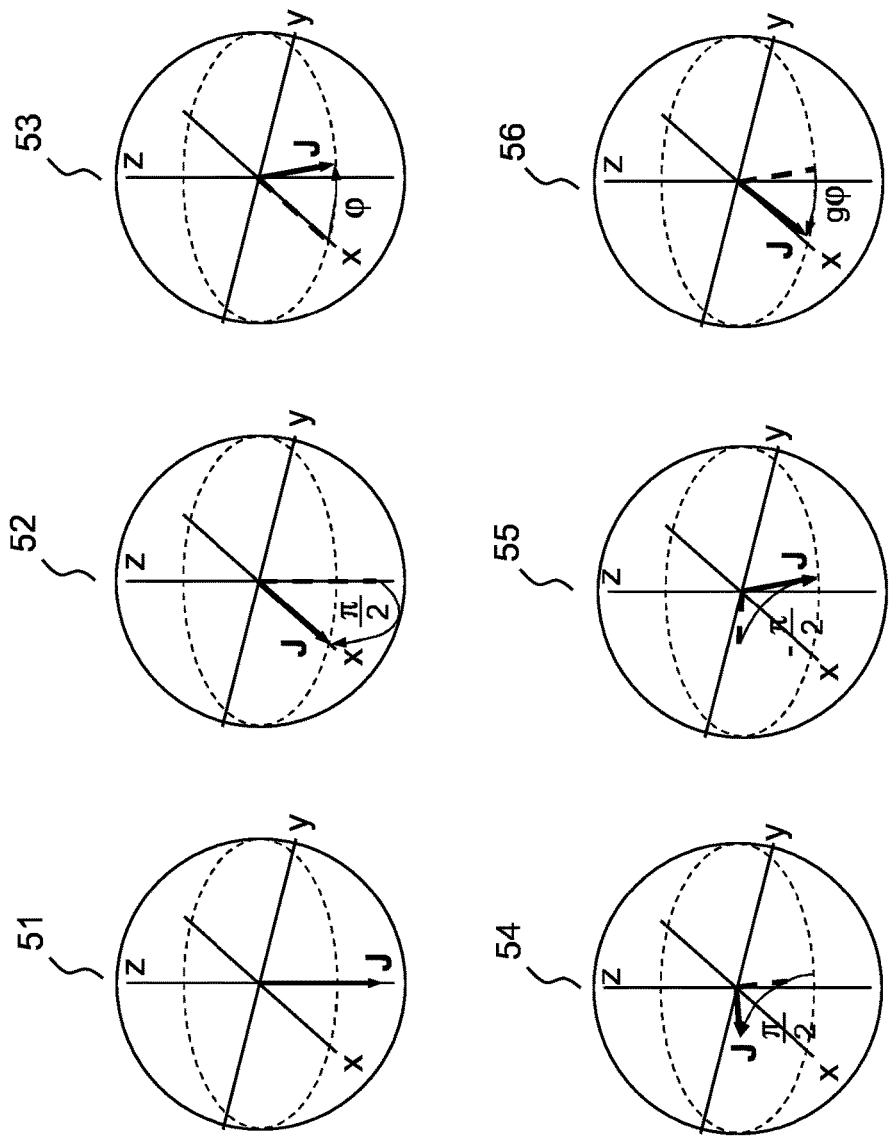
FIG. 5 illustrates a coherent spectroscopic method according to an embodiment of the present description using the Bloch sphere formalism.

FIG. 5 illustrates a coherent spectroscopic method according to an embodiment of the present description using the Bloch sphere representation (the Bloch sphere representation is described for example in F. T. Arecchi et al., "Atomic Coherent States in Quantum Optics", Phys. Rev. A 6, 2211 (1972)). The method as shown in FIG. 5 may be implemented for example using a system as described in FIG. 4 and adapted to achieve spectroscopic measurements or to be used as an atomic clock.

The phase lock between the local oscillator LO and the quantum system QS may be obtained using repeated 53-56 steps time correlated Ramsey interrogations and feedback.

The sequence begins by preparing via optical pumping (step 51) the quantum system QS, e.g. a collective state of $N_{at}$ two-level atoms in the same pure particle state (also called coherent spin state (CSS)) in the hyperfine level $|\downarrow\rangle$. The coherent spin state CSS forms a pseudo-spin represented in the Bloch formalism by the vector J having a length $J=N_{at}/2$.

The LO-atom relative phase comparison starts when a $\pi/2$ microwave pulse around the y axis brings the CSS into a balanced superposition of the two hyperfine levels and $|\downarrow\rangle$ and $|\uparrow\rangle$, represented by the vector J on the equatorial plane of ) the Bloch sphere (step 52), where $J_z$ denotes the population difference and $\varphi$=arcsin $(J_y/J_x)$ is the phase difference between the phase of the LO and that of the superposition state.

The relative phase $\varphi$ evolves because of the LO noise. It results in a rotation $\varphi$ of the Bloch vector J on the equatorial plane of the Bloch sphere (step 53).

After an interrogation sub-interval $T_i$, the projection of $\varphi$ is mapped onto a population difference by a second $\pi/2$ pulse (projection pulse) around the x axis and read out with the coherence preserving optical probe (step 54). The projection $J_z=J\sin(\varphi)$, which is the projection of the Bloch vector on the vertical axis is measured. As mentioned previously, the coherence preserving optical probe projects the atomic quantum state only negligibly and preserves the ensemble coherence.

Unlike for destructive measurements, the interrogation of φ can continue in a correlated way, once the action of the projection pulse is inverted using an opposite π/2 pulse (reintroduction pulse), which brings the QS into the previous coherent superposition (step 55).

After each coherence preserving measurement and reintroduction pulse, the phase read out can be used and feedback can be applied on the phase of the LO (step 56).

The phase locked loop between the LO and the QS consists in the repetition of the steps from 53 to 56, potentially till the QS shows a residual coherence.

Figure 6:
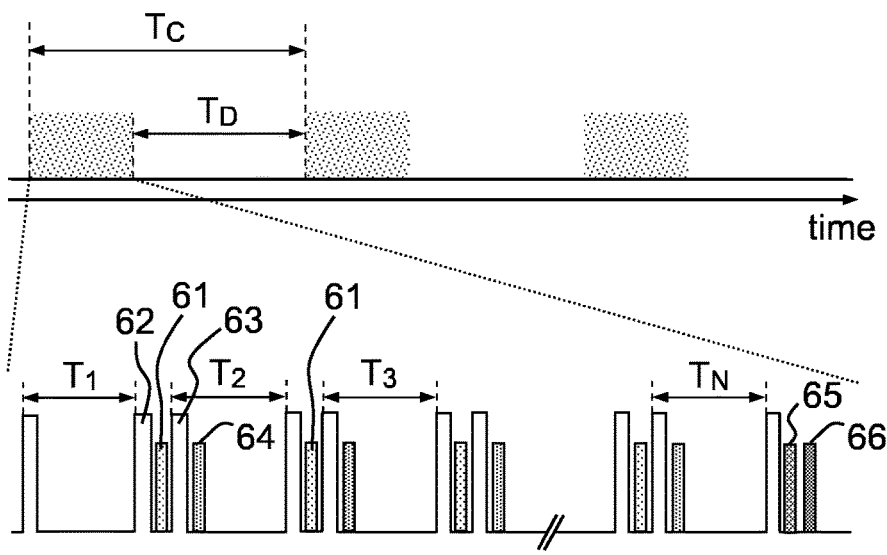
FIG. 6 illustrates through an example the sequence of operation as function of time in a method according to the present description.

FIG. 6 illustrates through an example the sequence of operations as function of time in a method according to the present description.

During subsequent cycles of duration $T_C$, the relative phase is repeatedly measured in a coherence preserving way during interrogation sub-intervals $T_i$. Each measurement, represented in the inset by a peak 61 between the projection and reintroduction π/2 pulses (respectively 62, 63), is followed by a phase correction $\varphi^{(i)}_{FB}$ on the LO, represented in the inset by a peak 64 after the reintroduction pulse. The final phase readout $\varphi_f$ (peak 65 in the inset), whose SNR is set by the final residual coherence, together with the previously applied phase shifts on the LO, provides the total phase difference φ experienced during the extended interrogation interval $T_{tot} = \Sigma T_i$. The total phase shift is reconstructed as the sum of the final phase difference $\varphi_f$ and the opposite of all the applied phase corrections $$-\sum_i \varphi^{(i)}_{FB}.$$

In the application of the atomic clock, the interrogation sequence ends with the application of a frequency correction on the LO (peak 66 in the inset), then a new atomic ensemble is prepared during the dead time interval $T_D$ for the next cycle.

Figure 7:
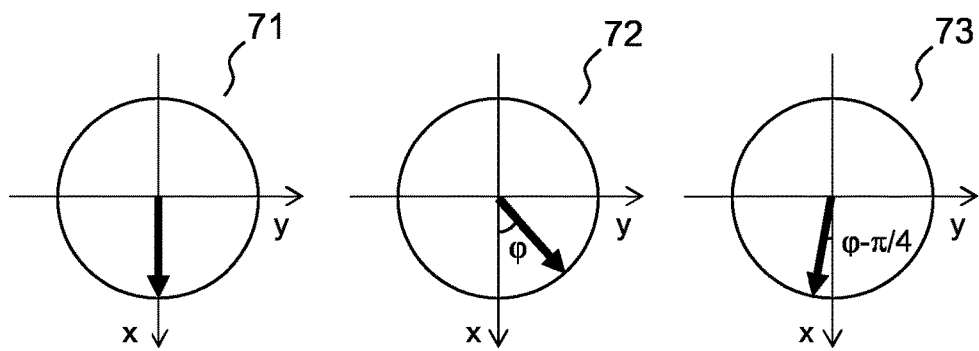
FIG. 7 illustrates a first variant of the coherent spectroscopic method described in FIG. 5.

FIG. 7 illustrates a first variant of the coherent spectroscopic method as described in FIG. 5. In the figures, the equatorial plane of the Bloch sphere is represented.

According to this variant, the QS is initially prepared in the superposition state represented by an arrow along the x-axis of the Bloch sphere (71); this operation initializes to zero the phase difference between the atomic sample and the local oscillator. After an interrogation sub-interval $T_i$ the phase difference φ between the QS and the LO is measured (72) using coherence preserving measurement means, and a phase correction $\varphi^{(i)}_{FB}$ of predetermined magnitude (π/4 in the example considered) and opposite sign with respect to φ is applied on the phase of the local oscillator or to the atomic ensemble through a microwave pulse (73) and stored in a controller unit. The repetition of this sequence avoids the drift of the phase difference φ towards the edges of the inversion region.

Figure 8:
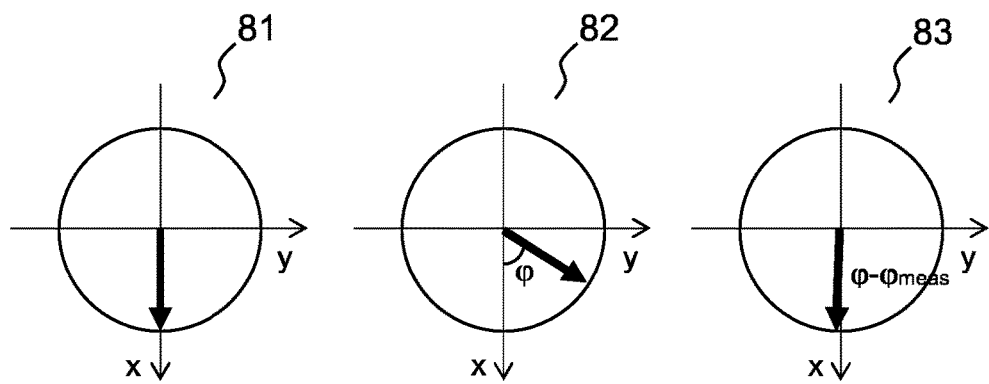
FIG. 8 illustrates a second variant of the coherent spectroscopic method described in FIG. 5.

FIG. 8 illustrates a second variant of the coherent spectroscopic method as described in FIG. 5. In these figures again, the equatorial plane of the Bloch sphere is represented.

The QS is here again initially prepared in the superposition state represented by an arrow along the x-axis of the Bloch sphere (81). After an interrogation sub-interval $T_i$ the local oscillator accumulates a phase difference p with respect to the QS (82); this angle is measured using coherence preserving measurement means and the result is $\varphi_{meas}$. According to this variant, the correction is applied shifting the phase difference by an angle equal to the measured one (83), so that the spin points along the x-axis within the uncertainty of the measurement. The sequence is repeated several times till the last destructive readout, and the applied phase shifts are stored in a controller unit.

Figure 9:
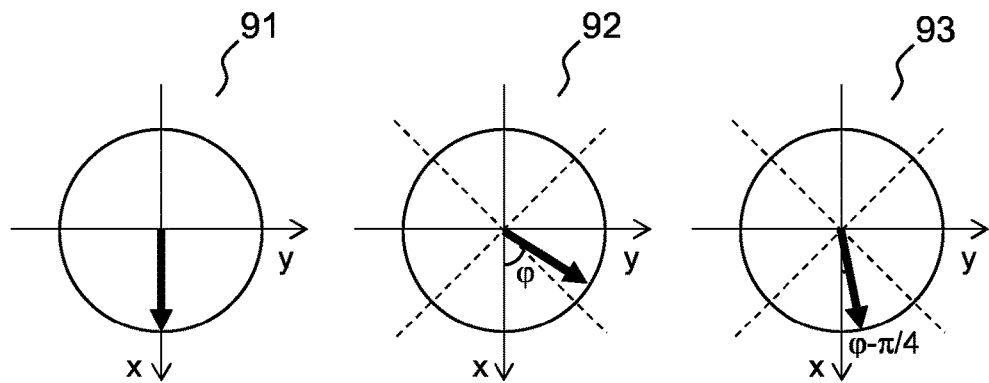
FIG. 9 illustrates a third variant of the coherent spectroscopic method described in FIG. 5.

FIG. 9 illustrates a third variant of the coherent spectroscopic method as described in FIG. 5. In these figures again, the equatorial plane of the Bloch sphere is represented.

As previously, the QS is initially prepared in the superposition state represented by an arrow along the x-axis of the Bloch sphere (91). In this variant, the drift of the phase difference φ is avoided by applying a phase shift only when the relative phase exceeds a predetermined angle, e.g. π/4 in the example considered (92). The correction phase is for example equal to the same predetermined angle and the direction is chosen so as to bring the vector close to the initial configuration (93).

In all the variants described above for the application of the correction phase in the phase lock sequence, several effects should advantageously be considered to maximize the last measurement SNR while maintaining a high accuracy on the measurement of the total phase difference over the extended interrogation time. In details, the following parameters have to be minimized: the time intervals required to operate the coherent manipulations on the Bloch sphere and interrogate the QS; the measurement induced decoherence for the intermediate phase evaluations; the inaccuracy of the phase shifter used for the phase corrections.

Figure 10A:
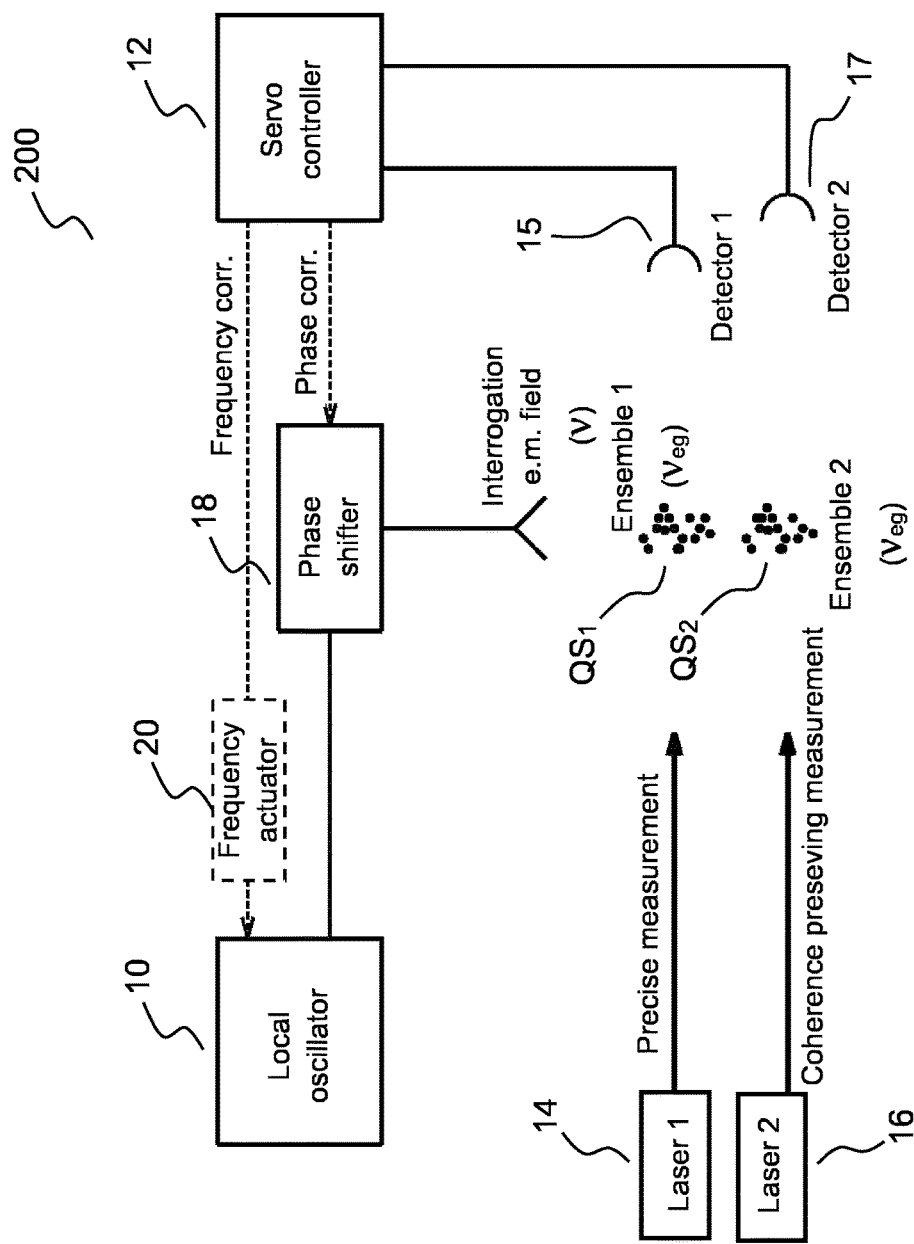
FIGS. 10A and 10B show general schemes of a second embodiment of a system adapted to implement coherent spectroscopic methods according to the present description.
Figure 10B:
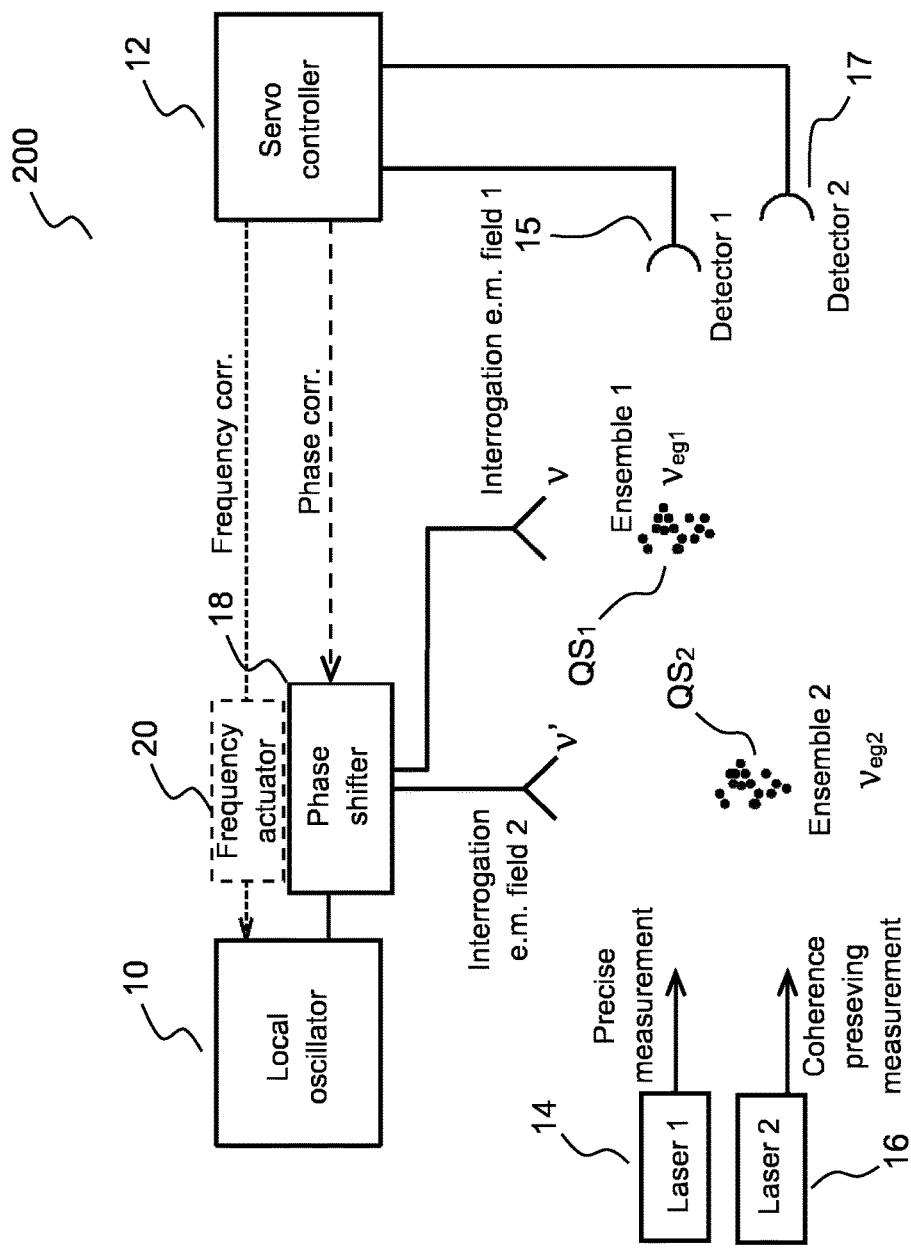

FIGS. 10A and 10B show general schemes of systems implementing a coherent spectroscopic method according to a further embodiment of the present description in which two atomic ensembles use the same LO.

A secondary quantum system ($QS_2$) provides the information to implement the phase feedback algorithm on the LO; the resulting corrected phase for the LO stays in the inversion region, and this prestabilized LO is used to interrogate a master quantum system ($QS_1$) with the standard Ramsey sequence. This scheme avoids the requirement of a trade-off between the number of intermediate measurements and the SNR of the final measurement by separating the two problems.

In the system shown in FIG. 10A, the master quantum system and the secondary quantum system have the same transition frequency $v_{eg}$. An interrogation electromagnetic field at the frequency ν of the local oscillator 10 may be used for interrogating both the master quantum system QS1 and the secondary quantum system QS2.

In the system as shown in FIG. 10B, the master quantum system and the secondary quantum system comprise ensembles of different species, having different transition frequencies, $v_{eg1}$ and $v_{eg2}$. An interrogation electromagnetic field at the frequency ν' phase locked to the LO signal at frequency ν may be used for interrogating the secondary quantum system QS2, while an interrogation electromagnetic field at the frequency ν of the LO signal may be used for interrogating the master quantum system QS1, as shown in FIG. 10B. The phase difference between the phase of the LO signal and that of the secondary quantum system QS2 may be obtained from the interrogations on QS2 performed with the signal at frequency ν' thanks to the phase lock condition between the two frequency signals ν and ν'.

Such condition may be obtained with different technical approaches; one solution consists in synthesizing the frequency signal ν' by implementing frequency divisions and multiplications on the LO frequency signal ν, e.g $$v' = \frac{n}{m}v,$$

where n and m are integers; other solutions could implement a phase-lock loop (PLL) between the two frequency signals; other solutions could implement a phase referencing of the two frequencies v and v' to a common reference signal, for example that produced by an optical frequency comb generator.

The methods described with reference to FIG. 4 to FIG. 10 comprise the step of shifting at the end of each interrogation sub-intervals $T_i$ the phase of the local oscillator signal, by a known correction value, so as to avoid that the phase difference between the local oscillator and the secondary quantum system approaches the limit of the inversion region. However, the same effects would apply in all embodiments described, with the shifting at the end of each interrogation sub-interval the phase of the quantum system by the afore-mentioned known correction value so as to avoid that the phase difference between the LO signal and the superposition state of the QS approaches the limit of the inversion region. Note that such methods may comprise directly the shifting of the phase of the master QS or the shifting of the phase of a secondary QS, when the methods implement two separated quantum systems having the same transition frequency or two different frequencies as explained above.

Figure 11:
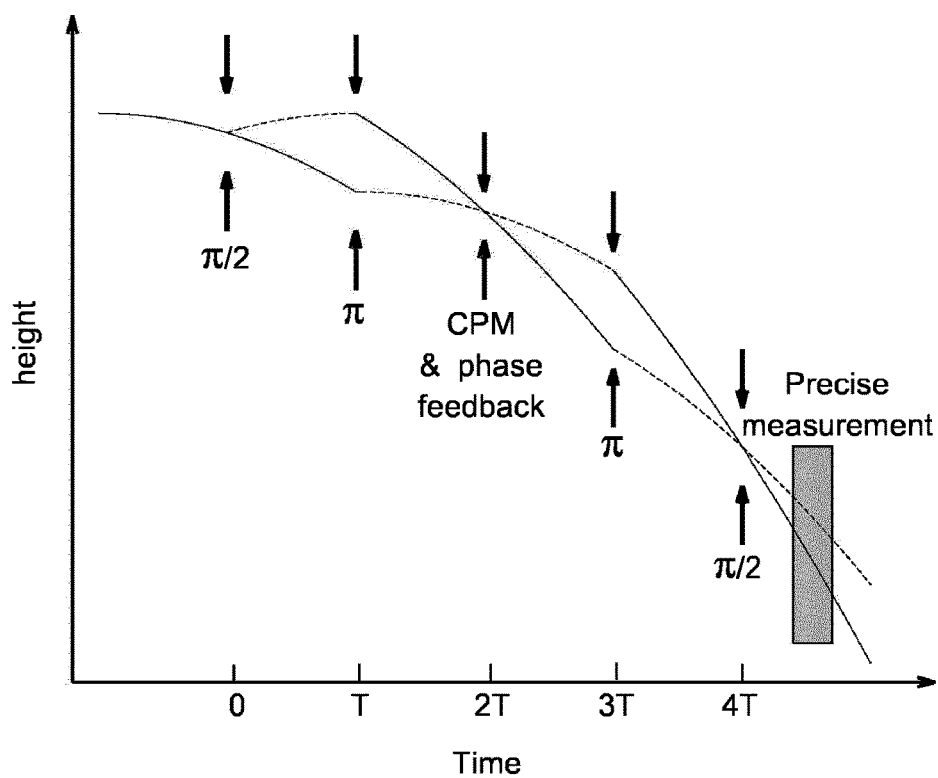
FIG. 11 shows the space-time diagram for an atomic ensemble in free fall during an interferometric sequence that implements coherent spectroscopic methods according to the present description.

FIG. 11 shows the space-time diagram for an atomic gravimeter, where an ensemble in free fall is interrogated with an interferometric sequence that implements coherent spectroscopic methods according to the present description.

Figure 1:
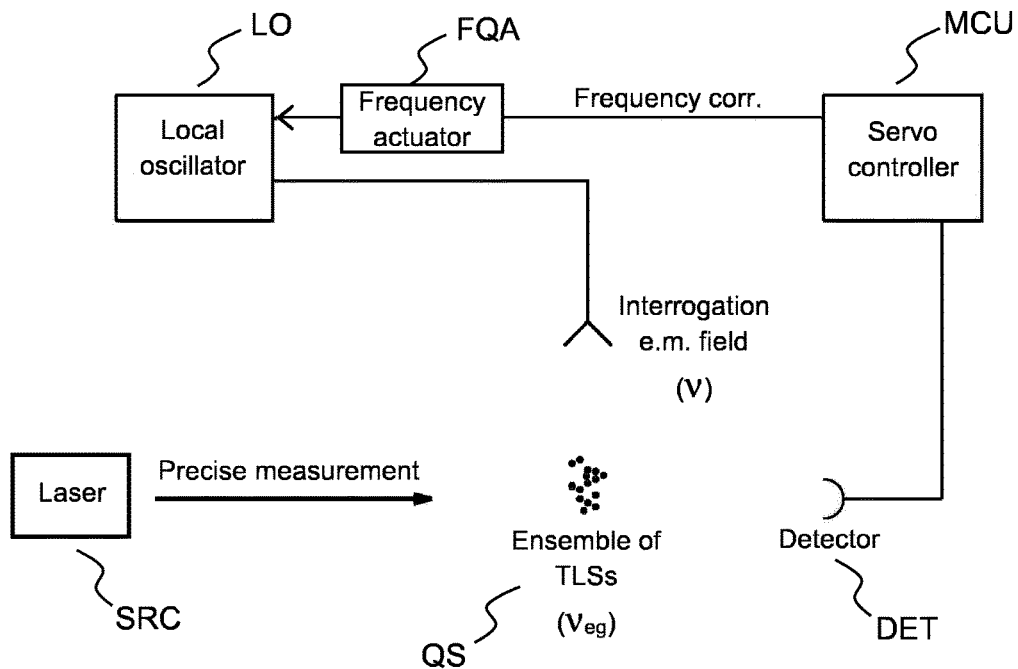
FIG. 1 (already described) shows a general scheme of an atomic clock according to the prior art.
Figure 2:
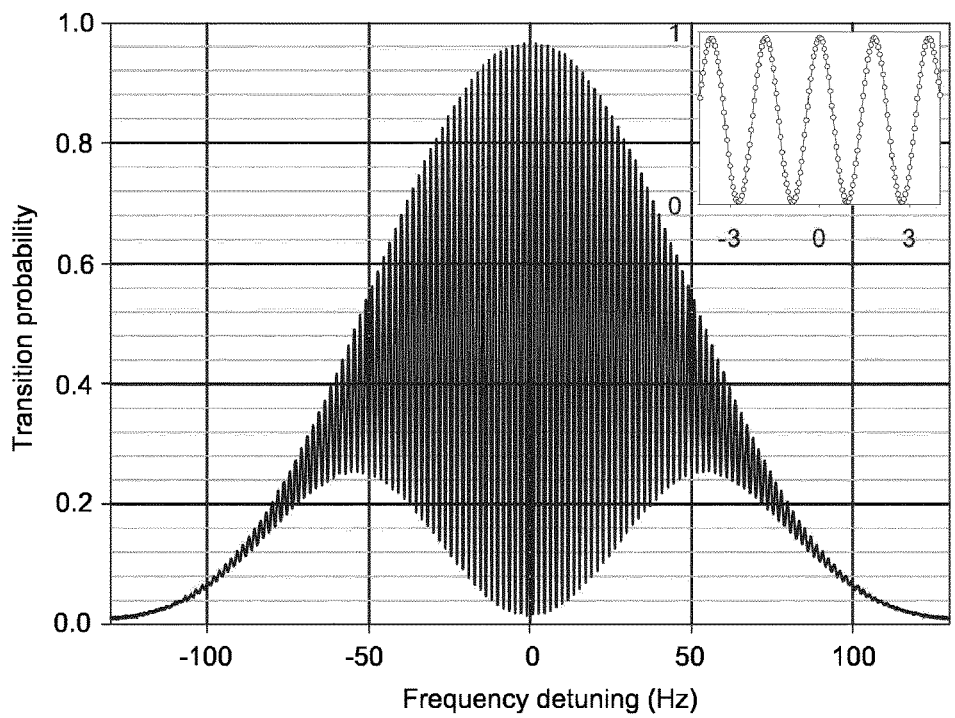
FIG. 2 (already described) shows the Ramsey fringes obtained with a cesium fountain clock.
Figure 3:
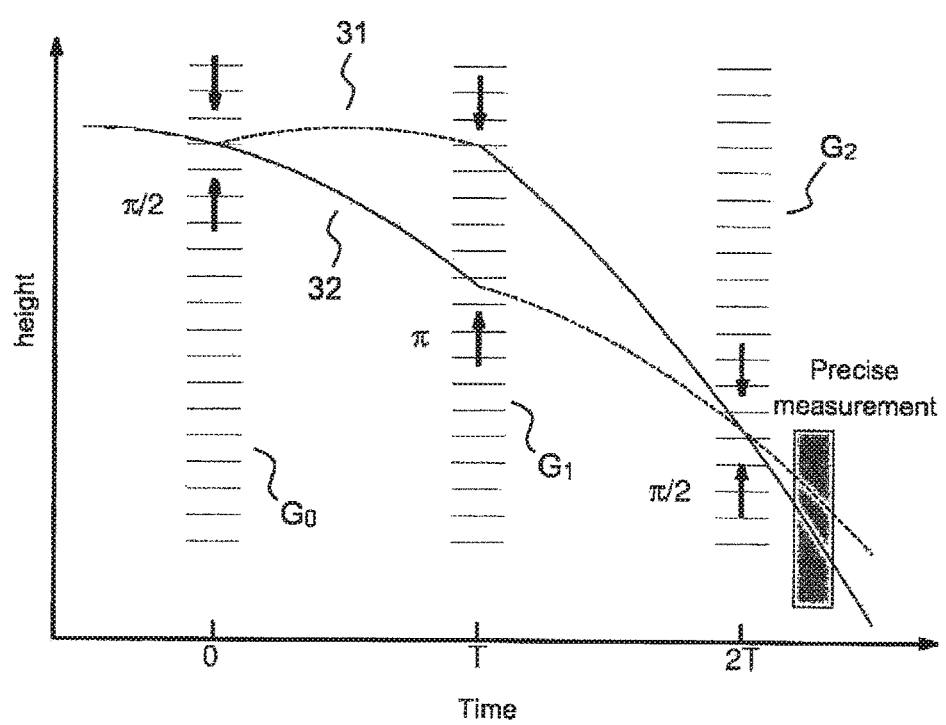
FIG. 3 (already described) shows a general scheme of an atomic inertial sensor according to the prior art.

In the first part the sequence follows a standard Mach-Zehnder configuration as shown in FIG. 3. A π/2 laser pulse at t=0 prepares the superposition state by splitting the atomic wave function over two trajectories that differ because of the momentum transfer associated to the two photon transition; this step is equivalent to 52 in FIG. 5 for an atomic clock, where the splitting is on the internal state. At t=T a π laser pulse deflects the two trajectories to make them convergent; this action has no equivalent in the atomic clock, since the momentum splitting associated to 52 of FIG. 5 is negligible. Once the two parts of the wave function overlap at t=2T, the relative phase between the two interferometer paths is probed using a coherence preserving measurement (CPM). This step can be implemented for example with a sequence of a projection π/2 pulse to map the interferometer phase to a population imbalance, non-destructive measurement of $J_z$, a reintroduction π/2 pulse to bring the quantum system back to the equatorial plane of the Bloch sphere (steps 54 and 55 in FIG. 5). Another way to realize the CPM consists in measuring the interferometer phase using a nondestructive version of the contrast interferometer technique (see for example S. Gupta et al., "Contrast Interferometry using Bose-Einstein Condensates to Measure h/m and α" Phys. Rev. Lett. 89, 140401 (2002)). The CPM is then followed by the application of feedback to maintain the readout phase within the inversion region (step 56 in FIG. 5), by acting, for example, on the phase of the optical lattice used to manipulate the atomic trajectories. The two atomic paths separate again, and are redirected using a π laser pulse at t=3T, so that they overlap a second time at t=4T, when a π/2 pulse projects the atomic ensembles so that the relative phase information is mapped onto a population imbalance and later read out with the precise measurement. This sequence can be straightforwardly extended to implement not a single but N intermediate coherent preserving measurements, with a corresponding N times longer interrogation time. The area of the interferometer, hence its sensitivity, increases linearly with N.

Figure 12:
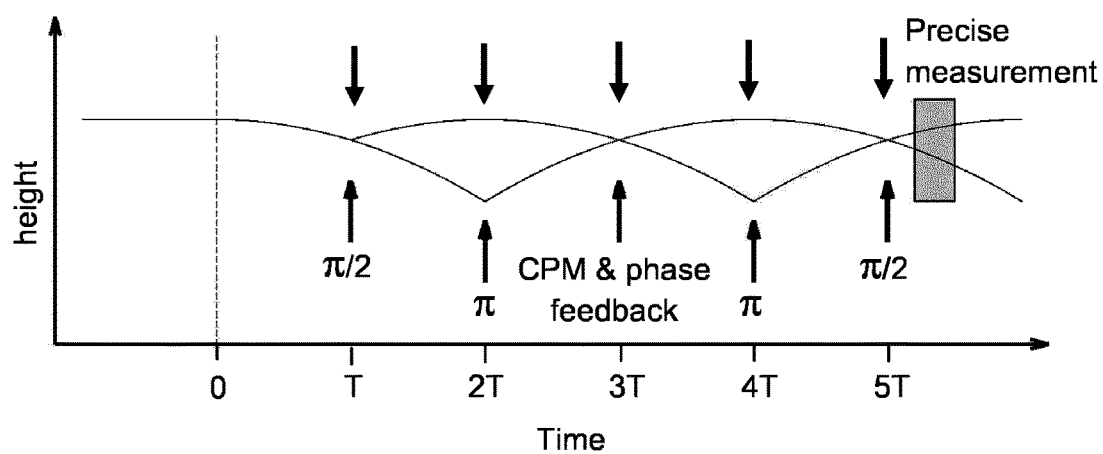
FIG. 12 shows the space-time diagram for a levitated atomic ensemble during an interferometric sequence that implements coherent spectroscopic methods according to the present description.

FIG. 12 shows the space-time diagram of an atomic gravimeter, where an ensemble is levitated during an interferometric sequence that implements coherent spectroscopic methods according to the present description.

The operation sequence resembles that described for FIG. 11, except for the timing of the π/2 and π laser pulses, which is set so as to levitate the wave function against the gravitational acceleration (see K. J. Hughes et al., "Suspension of Atoms Using Optical Pulses, and Application to Gravimetry" Phys. Rev. Lett. 102, 150403 (2009)). The CPM can be done at each time the two atomic trajectories overlap, i.e. at every multiple of t=2T. In the image a single intermediate CPM is shown, but the sequence can be extended to implement N successive CPMs. The extended interrogation time and the instrument sensitivity increase linearly with N.

FIG. 13 shows the sequence of operations in a trapped atomic gyroscope that implements coherent spectroscopic methods according to the present description. The atomic guide where the matter wave propagates is represented as a thick circle. At time t=0 the atomic wave function is split using a π/2 laser pulse (FIG. 13A); two wave packets in a superposition state move along the guide with opposite velocities (FIG. 13B), and periodically overlap every half circle evolution at multiples of time T. When the two path overlap, the relative phase cumulated on the two trajectories can be measured using CPMs and corrected for applying feedback to maintain the readout within the inversion region (FIG. 13C). The latter operation can be implemented, for example, by changing the phase of the optical lattice used to manipulate the atomic trajectories. The two wave packets continue their evolution in the atomic guide (FIG. 13D) till their trajectory overlap again (FIG. 13E) and a final phase measurement is performed using a precise probe. The total phase shift over the extended interrogation interval is then reconstructed by summing the last precise measurement and the opposite of the intermediate phase correction. This sequence, which implements here a single intermediate CPM, can be straightforwardly extended to N intermediate CPMs, with a corresponding N times longer interrogation time and N times higher sensitivity.

Although described through a certain number of detailed exemplary embodiments, the methods as described above may be implemented in any sensing system where the measurement relies on the coherent evolution of a quantum system and the phase determined by such evolution is obtained by measuring its geometrical projection as a population imbalance.

The methods and systems as described above comprise different variants, modifications and enhancements which will be obviously apparent to the person skilled in the art, it being understood that these different variants, modifications and enhancements form part of the scope of the invention, such as defined by the claims which follow.

The invention claimed is:

1. A coherent spectroscopic method to measure the total phase difference during an extended interrogation interval between a first signal delivered by a local oscillator and a second signal given by coherent ensembles of two-level systems comprising a master quantum system and a secondary quantum system, wherein each two-level system is in a superposition state of two quantum states, the method comprising:

reading out at the end of successive interrogation sub-intervals, intermediate error signals corresponding to an approximate phase difference between a phase of the local oscillator signal and that of the secondary quantum system, using coherence preserving measurements;

shifting at the end of each interrogation sub-intervals the phase of the local oscillator signal, by a known correction value to avoid that the phase difference between the local oscillator and the secondary quantum system approaches a limit of the inversion region, thus obtaining a prestabilized local oscillator;

reading out a final phase difference between a phase of the prestabilized local oscillator signal and that of the superposition state of the master quantum system using a measurement with no restriction on the destruction of the coherence of the master quantum system; and reconstructing a total phase difference over the extended interrogation interval defined as the sum of all successive interrogation sub-intervals, the total phase difference being reconstructed as the sum of the final phase difference and the opposite of all the applied phase corrections $$\left(-\sum_i \varphi_{FB}^{(i)}\right).$$

2. The coherent spectroscopic method as claimed in claim 1, wherein the master and the secondary quantum systems are two separated quantum systems having the same or different transition frequencies and the intermediate error signals correspond to the approximate phase difference between the phase of the local oscillator signal and that of the superposition state of said secondary quantum system.

3. The coherent spectroscopic method as claimed in claim 1, wherein the secondary quantum system is the master quantum system itself and the intermediate error signals correspond to the approximate phase difference between the phase of the oscillator signal and that of the superposition state of the master quantum system.

4. The coherent spectroscopic method as claimed in claim 1, wherein shifting the phase of the local oscillator signal is made only when the measured error signal exceeds a predetermined value within the inversion region.

5. The coherent spectroscopic method as claimed in claim 1, wherein the correction value is a predetermined absolute value, and the sign is opposite with respect to that of the measured relative phase.

6. The coherent spectroscopic method as claimed in claim 1, wherein the correction value is negatively proportional to the measured error signal to bring the phase difference close to zero.

7. A coherent spectroscopic method to measure the total phase difference during an extended interrogation interval between a first signal delivered by a local oscillator and a second signal given by coherent ensembles of two-level systems comprising a master quantum system and a secondary quantum system, wherein each two-level system is in a superposition state of two quantum states, the method comprising:

reading out at the end of successive interrogation sub-intervals intermediate error signals corresponding to the approximate phase difference between the phase of the oscillator signal and that of the secondary quantum system, using preserving coherence measurements;

shifting at the end of each sub-interrogation intervals the phase of the secondary quantum system by a known correction value to avoid that the phase difference between the local oscillator and the secondary quantum system approaches a limit of the inversion region;

reading out a final phase difference between the phase of the local oscillator and that of the superposition state of the master quantum system using a precise measurement with no restriction on the destruction of the coherence of the master QS; and reconstructing a total phase difference over the extended interrogation interval defined as the sum of all successive interrogation sub-intervals, the total phase difference being reconstructed as the sum of the final phase difference and the opposite of all the applied phase corrections $$\left(-\sum_i \varphi_{FB}^{(i)}\right).$$

8. The coherent spectroscopic method as claimed in claim 1, implemented in an atomic clock, further comprising:
changing the frequency of the local oscillator signal at the end of an extended interrogation interval by the total phase difference divided by the extended interrogation interval.

9. The coherent spectroscopic method as claimed in claim 1 implemented in a matter wave inertial sensor used to determine an acceleration, an acceleration gradient or a rotation from the total phase difference measured over the extended interrogation interval.

10. The coherent spectroscopic method as claimed in claim 1, implemented in hybrid inertial navigation systems, which combines an atom interferometry based sensor and a second sensor with a continuous readout, further comprising:
calibrating the output of the sensor with continuous readout at the end of each extended interrogation interval, using the absolute readout of the matter wave sensor represented by the total phase difference measured over the extended interrogation interval.

11. A system for implementing a coherent spectroscopic, comprising:
coherent ensembles of two-level systems comprising a master quantum system and a secondary quantum system, wherein each two-level system is in a superposition state of two quantum states,
a local oscillator delivering an oscillator signal;
a preserving coherence measurement probe, to read out after interrogation sub-intervals intermediate error signals corresponding to the approximate phase difference between the phase of the oscillator signal and that of the secondary quantum system;
a phase actuator for shifting at the end of each interrogation sub-intervals the phase of the local oscillator signal, thus obtaining a prestabilized local oscillator, by a known correction value to avoid that the phase difference between the local oscillator and the secondary quantum system approaches a limit of the inversion region;
a measurement probe to read out with no restriction on the destruction of the coherence of the master quantum system a final phase difference between the phase of the prestabilized oscillator signal and that of the superposition state of the master quantum system; and a control unit for reconstructing the total phase difference over an extended interrogation interval defined as the sum of all successive interrogation sub-intervals, as the sum of the final phase difference and the opposite of all the applied phase corrections $$\left(-\sum_i \varphi_{FB}^{(i)}\right).$$

12. The system for implementing a coherent spectroscopic method as claimed in claim 11, wherein the master and the secondary quantum systems are two separated quantum systems having the same or different transition frequencies and the intermediate error signals correspond to the approximate phase difference between the phase of the local oscillator signal and that of the superposition state of said second quantum system.

13. An atomic clock comprising the system for implementing a coherent spectroscopic method as claimed in claim 11, wherein the signal delivered by the local oscillator is the clock signal, and further comprising:
 a frequency actuator to change the frequency of the clock signal as function of the total phase difference.

14. A matter wave inertial sensor comprising: a system as claimed in claim 11, wherein said matter wave inertial sensor is used to determine an acceleration, an acceleration gradient or a rotation from the total phase difference measured over the extended interrogation interval.

15. An hybrid inertial navigation system comprising: a system as claimed in claim 11, wherein said system for implementing a coherent spectroscopic method is combined with a second sensor with a continuous readout.

* * * * *